United States Patent
Ishihara

(10) Patent No.: US 7,800,693 B2
(45) Date of Patent: Sep. 21, 2010

(54) TELEVISION RECEIVER

(75) Inventor: Hidetoshi Ishihara, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1148 days.

(21) Appl. No.: 11/442,977

(22) Filed: May 31, 2006

(65) Prior Publication Data

US 2006/0271984 A1 Nov. 30, 2006

(30) Foreign Application Priority Data

May 31, 2005 (JP) .............................. 2005-159495

(51) Int. Cl.
H04N 5/50 (2006.01)
(52) U.S. Cl. ..................................................... 348/552
(58) Field of Classification Search ................ 348/725, 348/731, 552, 553, 569, 570
See application file for complete search history.

(56) References Cited

U.S. PATENT DOCUMENTS

| 7,227,583 B2 * | 6/2007 | Sin ............................. 348/570 |
| 7,277,894 B2 * | 10/2007 | Kondo et al. ................. 707/102 |
| 2002/0054342 A1 * | 5/2002 | Fujiwara ..................... 358/1.15 |
| 2005/0102696 A1 * | 5/2005 | Westberg ....................... 725/46 |
| 2005/0125825 A1 * | 6/2005 | Nakayama ..................... 725/45 |
| 2005/0141870 A1 * | 6/2005 | Suzuki .......................... 386/83 |
| 2007/0113257 A1 * | 5/2007 | Takemoto ................... 725/131 |

FOREIGN PATENT DOCUMENTS

| JP | 05-236394 A | 9/1993 |
| JP | 09-261554 A | 10/1997 |
| JP | 11-203850 A | 7/1999 |
| JP | 2001-245238 A | 9/2001 |

* cited by examiner

Primary Examiner—Paulos M Natnael
(74) Attorney, Agent, or Firm—Crowell & Moring LLP

(57) ABSTRACT

Disclosed is a television receiver comprising: a receiving section to receive a broadcast signal associated with predetermined broadcasting; a video display section to display received video based on the broadcast signal received by the receiving section in a predetermined display region; a judgment region setting section to set a judgment region for judging whether or not the broadcasting has ended, the judgment region being in the display region of the video display section; a judging section to judge whether or not the broadcasting has ended, based on a received video in the judgment region of the received video corresponding to the broadcast signals; and a video stop control section to switch off the power source of the television receiver, on a basis that the judging section judges that the broadcasting has ended.

6 Claims, 5 Drawing Sheets

TELEVISION RECEIVER

BACKGROUND OF THE INVENTION

1. Field of the Invention

The present invention relates to a television receiver.

2. Description of Related Art

Conventionally, there have been television receivers which output video and audio in compliance with broadcasted signals by receiving the broadcasted signals of a selected channel.

In the television receivers, such a television receiver has been known, which monitors whether or not broadcast signals received via an antenna and a tuner are provided, and simultaneously turns off the power source of the television receiver by judging that the program broadcasting has ended where it is detected that no broadcasting signal is inputted, and where it is detected that a broadcasting signal is a signal associated with a predetermined video pattern (for example, a color bar image or monoscopic image after program broadcasting is ended) (for example, see JP 05-236394A and JP 2001-245238A).

Also, such a television receiver has been known, which monitors availability (presence) of broadcast signals based on a synchronization signal used for channel selection and an AFT signal, and turns off the power source of the television receiver by judging that, where no broadcasting signal is inputted, program broadcasting has ended (for example, see JP 11-203850A).

Further, such a television receiver has been known, which turns off the power source thereof where it is detected that program broadcasting has ended where an invalid video and non-video state are included in video corresponding to inputted broadcast signals and video signals over a predetermined period of time, and where it is detected that an audio-free state is included in audio corresponding to inputted broadcast signals and video signals over a predetermined period of time (for example, JP 09-261554A).

In recent years, such a television receiver has been known, which acquires a chronological fluctuation ratio of image data by comparing the broadcast signals received by the television receiver with the video image data corresponding thereto at predetermined timing since there are cases where a scenery video photographed by a fixed TV camera is continuously broadcasted after predetermined program broadcasting was ended, and judges that the program broadcasting has ended, by judging that, where the fluctuation ratio of the image data is less than a predetermined threshold value, the broadcasting signal is a signal associated with a scenery video after the broadcasting is ended.

However, in cases of such earlier development, there may be cases where, since the fluctuation ratio of image data of the broadcasting signals exceeds a predetermined threshold value by switching display and non-display of weather forecasting at a corner of the scenery video even if the broadcasting signal received by a television receiver is a signal associated with a scenery video after the program broadcasting is ended, it is not possible to judge that the program broadcasting has ended. In such cases, since the power source of the television receiver cannot be turned off although the program broadcasting is ended, there is a problem in that predetermined electric power saving cannot be achieved.

Further, where, when watching a movie on a screen of normal television size (4:3 full screen size), movie images are displayed in the letter box size with a black belt remaining on the top and bottom of the screen so that video images are watched in the wide screen size of 16:9, no video change is provided at the black belt zones, and it is judged that the image fluctuation ratio of image data as the entire video is low, wherein it is judged that the program broadcasting has ended since the fluctuation ratio is made lower than the predetermine threshold value. Therefore, there is another problem in that the power source of the television receiver is turned off while watching a movie.

SUMMARY OF THE INVENTION

It is one of objects of the present invention to provide a television receiver capable of further accurately judging whether or not broadcasting of a watching program has ended.

According to a first aspect of the invention, a television receiver comprises: a receiving section to receive a broadcast signal associated with predetermined broadcasting; a video display section to display received video based on the broadcast signal received by the receiving section in a predetermined display region; a judgment region setting section to set a judgment region for judging whether or not the broadcasting has ended, at a center of the display region of the video display section; an off-timer control section to count a predetermined set time, and to switch the power source of the television receiver from ON to OFF when the set time lapses; a judging section to judge whether or not the broadcasting has ended, on a basis that a ratio of chronological fluctuation of received video in the judgment region of the received videos corresponding to the broadcast signal is within a predetermined range, while the off timer control section counts the set time; and a video stop control section to switch off the power source of the television receiver, on a basis that the judging section judges that the broadcasting has ended.

By doing so, when broadcasting is carried out so that received video images based on broadcast signals associated with predetermined broadcasting, which are received by a receiving section in a television receiver are displayed at a display region of the video display section, it is possible to turn off the power source of the television receiver based on the television receiver having judged that predetermined broadcasting has ended on the basis that the chronological fluctuation of received videos corresponding to the judgment region set at the center of the display region is in a range of a predetermined ratio.

In particular, since the judgment region in the display region of the video display section is set at the center of the display region in this television receiver, it is possible to prevent the display section, which is frequently displayed at a corner of the display region and hinders judgment for end of broadcasting, from entering the judgment region.

Accordingly, the television receiver can further accurately judge the end of predetermining broadcasting.

Since the end of broadcasting can be accurately judged and the power source of the television receiver can be turned off, it is possible to reduce power consumption of the television receiver and to save electric power.

Further, with the television receiver, it is possible to judge, based on the ratio of the chronological fluctuation of received videos being in a predetermined range, that predetermined broadcasting has ended. A state where the ratio of the chronological fluctuation of received video based on broadcast signals is in a predetermined range means a state where video hardly changes. For example, since the state corresponds to a state where a video showing the surrounding scenery of a broadcasting station is displayed after the broadcasting is ended, with the television receiver, it is possible to turn off the power source of the television receiver when predetermined broadcasting is ended and "a video of a surrounding scenery of the broadcasting station" is displayed.

Therefore, since the television receiver is turned off so that the video of a surrounding scenery of the broadcasting station, which is an unnecessary video after the broadcasting is ended, is not broadcasted, electric power saving can be achieved.

Still further, the television receiver is provided with OFF-timer control section such as a good-night timer which counts a predetermined set time, and at the same time, switches the power source of the television receiver from ON to OFF in the set time, wherein it is judged whether or not predetermined broadcasting is ended in a state where the timer is set so that the set time is counted. That is, a user sets a setting time as the power source turning-off time, using the OFF-timer control section such as a good-night timer, and when the user intends to watch received videos based on broadcast signals associated with predetermined broadcasting, for example, for how many more hours or up to what time, the television receiver is turned off so that unnecessary video after the broadcasting is ended are not displayed when the broadcasting is ended before the set time, wherein electric power saving can be achieved.

According to a second aspect of the invention, television receiver comprises: a receiving section to receive a broadcast signal associated with predetermined broadcasting; a video display section to display received video based on the broadcast signal received by the receiving section in a predetermined display region; a judgment region setting section to set a judgment region for judging whether or not the broadcasting has ended, the judgment region being in the display region of the video display section; a judging section to judge whether or not the broadcasting has ended, based on a received video in the judgment region of the received video corresponding to the broadcast signals; and a video stop control section to switch off the power source of the television receiver, on a basis that the judging section judges that the broadcasting has ended.

By doing so, when broadcasting is carried out in the television receiver so that a received video based on broadcast signals associated with predetermined broadcasting, which are received by the receiving section, are displayed in the display region of the video display section, the power source of the television receiver can be turned off based on the television receiver having judged that the predetermined broadcasting has ended.

In particular, since the judgment region in the display region of the video display section can be optionally set in the television receiver, a display region where it is easy to judge the end of broadcasting based on a received video is made into a judgment region and is set so that a display section which hinders judgment of the terminal of broadcasting does not enter the judgment region, wherein it becomes possible to further accurately judge the end of predetermined broadcasting.

Since the end of broadcasting is accurately judged and the power source of the television receiver can be turned off, it is possible to reduce power consumption of the television receiver, and electric power saving can be achieved.

Preferably, the judging section judges end of the broadcasting on a basis that the ratio of chronological fluctuation of the received video is within a predetermined range.

Therefore, it is possible for the judging section to judge the end of broadcasting based on the ratio of chronological fluctuation of received videos being within a predetermined range.

Herein, a state where the ratio of the chronological fluctuation of the received video based on the broadcast signals is within a predetermined range means a state where the video hardly changes. For example, since the state corresponds to a state where a video showing the surrounding scenery of a broadcasting station is displayed after the broadcasting is ended, with the television receiver, it is possible to turn off the power source of the television receiver when predetermined broadcasting is ended and a "video of a surrounding scenery of the broadcasting station" is displayed.

Therefore, since the television receiver is turned off so that the video of a surrounding scenery of the broadcasting station, which is an unnecessary video after the broadcasting is ended, is not broadcasted, electric power saving can be achieved.

Preferably, the television receiver further comprises an off-timer control section to count a predetermined set time, and to switch the power source of the television receiver from ON to OFF when the set time lapses, wherein a judging section judges whether or not the broadcasting has ended, while the off-timer control section counts the set time.

By doing so, the television receiver is provided with OFF-timer control section such as a good-night timer which counts predetermined set time, and at the same time, switches the power source of the television receiver from ON to OFF in the set time, wherein it is judged whether or not predetermined broadcasting is ended in a state where the timer is set so that the set time is counted.

That is, a user sets a setting time as the power source turning-off time, using the OFF-timer control section such as a good-night timer, and when the user intends to watch received videos based on broadcast signals associated with predetermined broadcasting, for example, for how many more hours or up to what time, the television receiver is turned off so that unnecessary videos after the broadcasting is ended are not displayed when the broadcasting is ended before the set time, wherein electric power saving can be achieved.

Preferably, the judging region is set at a center of the display region.

By doing so, since the judgment region is set at the center of the display region, it is possible to prevent the display section, which is frequently displayed at a corner of the display region and hinders judgment for end of broadcasting, from entering the judgment region.

Therefore, the television receiver can further accurately judge the end of predetermining broadcasting.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE PREFERRED EMBODIMENT

Hereinafter, a detailed description is given of an embodiment of a television receiver according to the invention with reference to the accompanying drawings.

Figure 1:
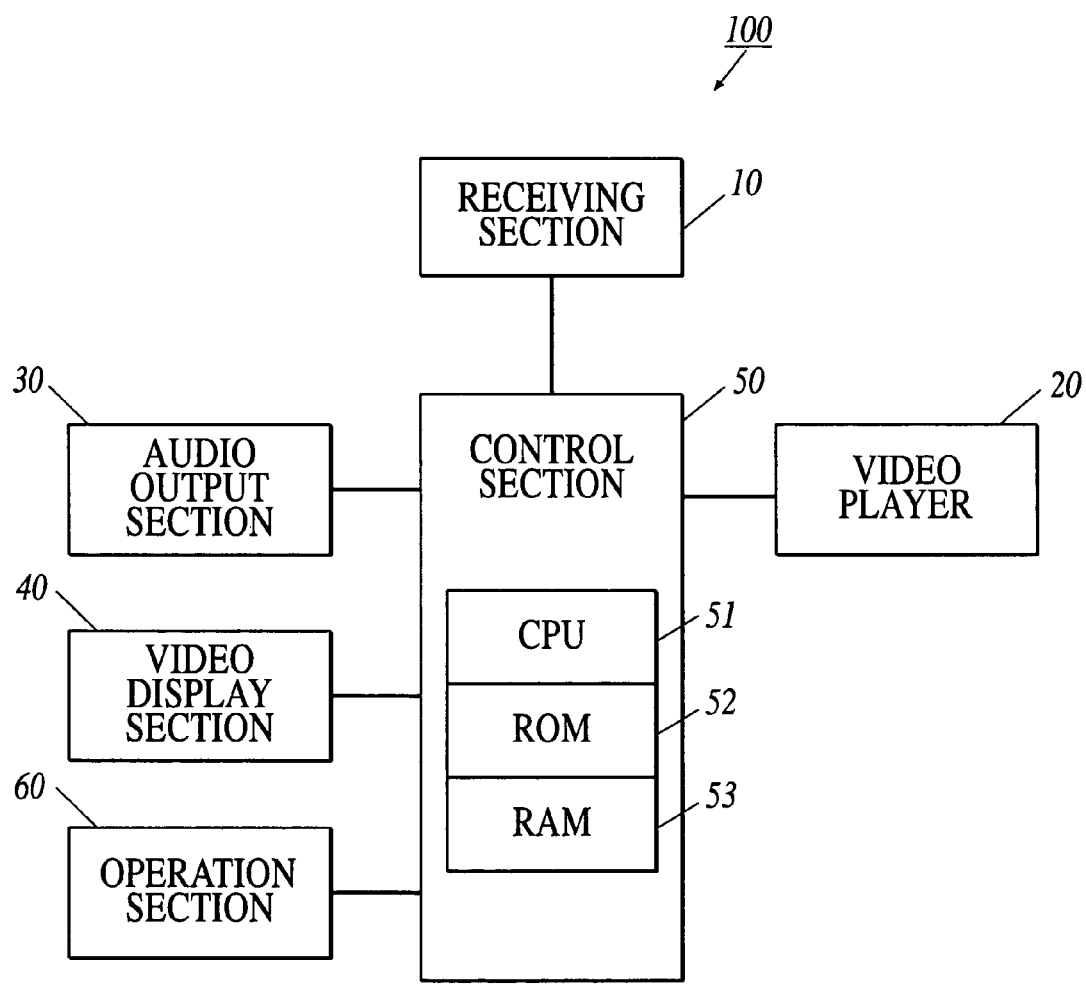
FIG. 1 is a block diagram depicting the major parts of a television receiver according to the invention.

FIG. 1 is a block diagram depicting the major parts of a television receiver according to the invention.

As depicted in FIG. 1, a television receiver 100 includes: a receiving section 10 to receive broadcast signals; a video player 20 to replay video signals recorded in a recording medium; an audio output section 30 to output audio responsive to received video data based on the broadcast signals and audio responsive to reproduced video data based on the video signals; a video display section 40 to display received videos responsive to received video data based on the broadcast signals and reproduced videos responsive to reproduced video data based on the video signals; an operation section 60 to carry out predetermined setting inputs and operation inputs to a television receiver; and a control section 50 to control movements of the respective sections described above. Also, the television receiver is a television receiver having a video player integrated therein.

The receiving section 10 is, for example, an antenna unit that receives predetermined broadcast signals responsive to a selected channel, and also transmits the received broadcast signals to the control section 50.

The video player 20 is, for example, a DVD (Digital Versatile Disk) unit that reproduces video signals recorded in a DVD being a predetermined recording medium, converts the video signals to video data for reproduction, which consists of audio data and image data being digital data, and simultaneously outputs the audio data and image data of reproduced video data based on the video signals to the audio output section 30 and the video display section 40 via the control section 50.

The audio output section 30 is, for example, a speaker unit that outputs audio responsive to audio data of received video data based on the broadcast signals received by the receiving section 10 and audio responsive to audio data of the reproduced video data based on the video signals reproduced by the video player 20.

Figure 2:
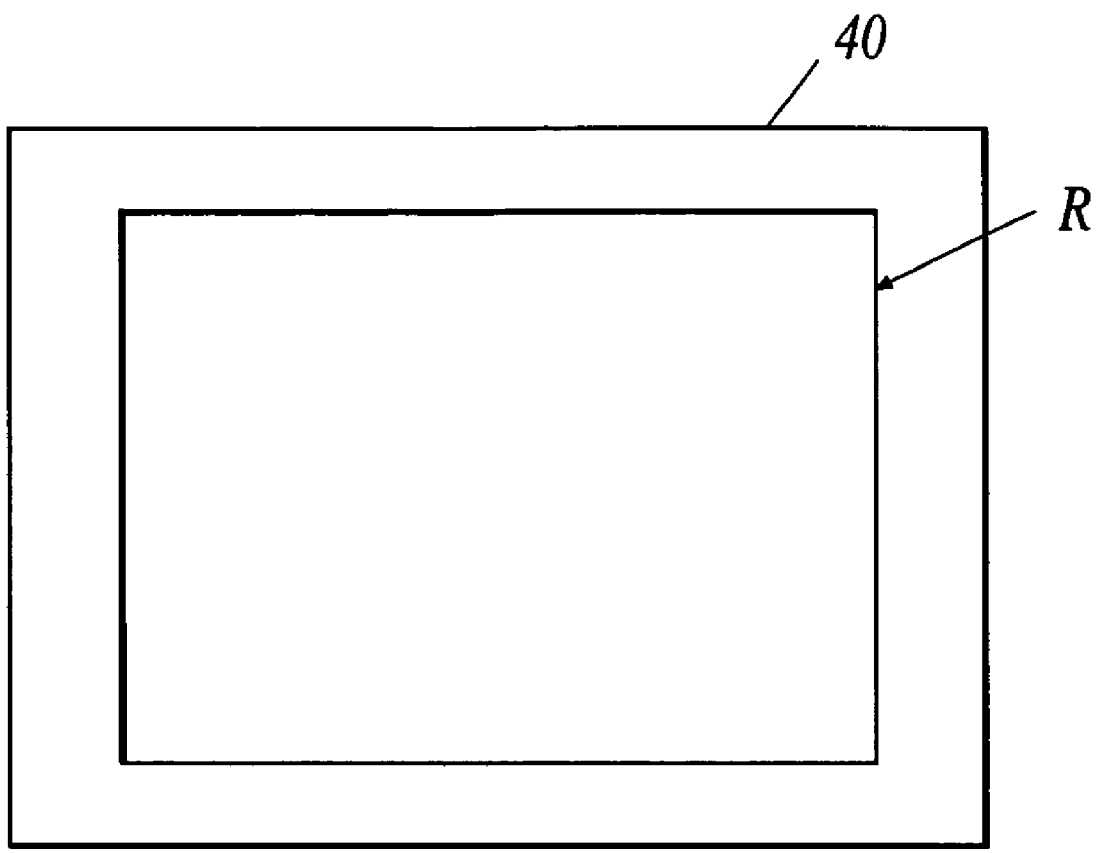
FIG. 2 is a front elevational view depicting the video display section.

The video display section 40 is, for example, a liquid crystal display device, which displays a received video responsive to image data of received video data based on broadcast signals received by the receiving section 10, and a reproduced video responsive to image data of the video data for reproduction based on video signals reproduced by the video player 20. The video display section 40 is provided with a display region R for displaying received videos and reproduced videos as depicted in FIG. 2.

The operation section 60 is provided with various types of operation keys (not illustrated) for carrying out predetermined set inputs and operation inputs for the television receiver 100.

In particular, the operation section 60 functions as a part of judgment region setting section to set a judgment region H, described later, for the display region R of the video display section 40.

The control section 50 includes, for example, a CPU 51, which intensively controls movements of respective parts in compliance with various types of control programs for a television receiver, which are stored in a ROM 5, etc., in response to operation input signals inputted from the operation section 60 and preset data, and stores the processing results in a work region in a RAM 53.

The control section 50 controls movements of the respective parts that compose the television receiver 100.

The control section 50 converts broadcast signals received by the receiving section 10 to received video data consisting of audio data and image data being digital data, and functions as received video output control section to output audio data and image data of the received video data based on the broadcast signals to the audio output section 30 and the video display section 40.

In addition, the control section 50 functions as judgment region setting section to set a judgment region H to judge whether or not predetermined broadcasting is ended, associated with the display region R of the video display section 40.

When a predetermined operation key of the operation section 60 is pressed, the control section 50 operating as the judgment region setting section carries out control of setting the judgment region H so that the display region R of the video display section 40 is divided into the judgment region H and non-judgment region B.

Various types of judgment region patterns are available as the judgment region H of the display region R in the video display section 40 as depicted in FIGS. 3A to 3D.

Figure 3A:
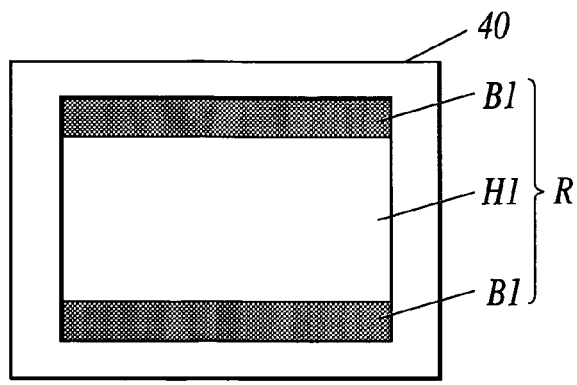
FIGS. 3A to 3D are schematic views depicting judgment region patterns (four patterns of FIG. 3A to FIG. 3D) in the display region of the video display section.

For example, in the display region R of the video display section 40 depicted in FIG. 3A, a judgment region H1 is set at the center of the display region R, and non-judgment regions B1 are set so as to be positioned above and below the judgment region H1. The patterns of the judgment region H1 are effective where, when watching videos of a movie in the wide screen size of 16:9 using a screen of the normal television size (full screen size of 4:3), black belt zones displayed at the top and bottom of the display region R are made into non-judgment regions B1, and where inserting images and superimposed dialogs such as a weather forecasting chart displayed in the top or bottom of the display region R are made into non-judgment region B1.

Figure 3B:
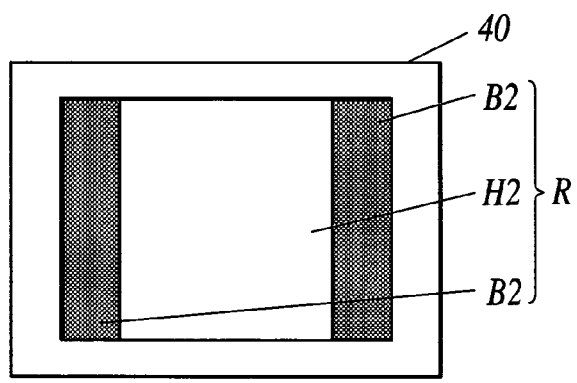

In the display region R of the video display section 40 depicted in FIG. 3B, a judgment region H2 is set at the center of the display region R, and non-judgment regions B2 located at the left and right sides of the judgment region H2 are set. The pattern of the judgment region H2 is effective where, when watching videos of the normal television size (full screen size of 4:3) using a screen of the wide screen size of 16:9, black belt zones displayed at the left and right of the display region R are made into a non-judgment regions B2, and where inserting images and superimposed dialogs such as a weather forecasting chart displayed in the left or right of the display region R are made into a non-judgment region B2.

Figure 3C:
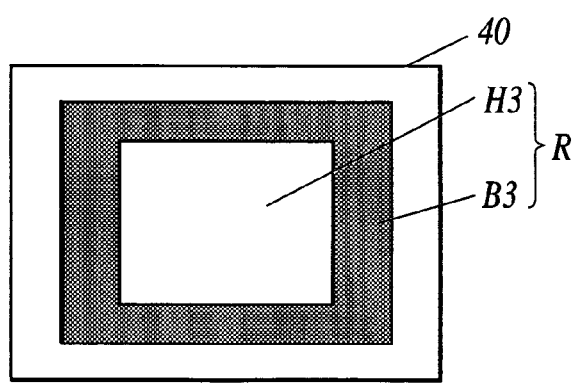

In the display region R of the video display section 40 depicted in FIG. 3C, a judgment region H3 is set at the center of the display region R, and a non-judgment region B3 located at the surrounding of the judgment region H3 is set. The pattern of the judgment region H3 is effective where a video is displayed in a small screen size at the center of the display region R.

Figure 3D:
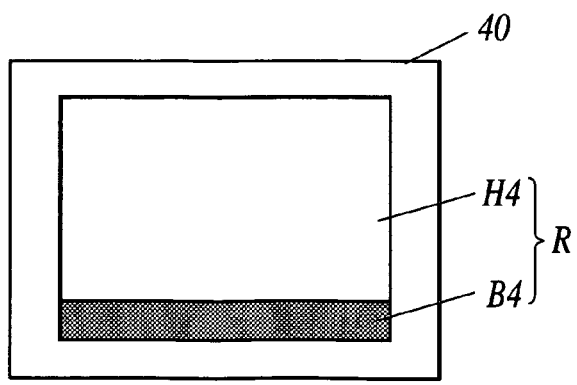

In the display region R of the video display section 40 depicted in FIG. 3D, a judgment region H4 is set at the center of the display region R, and a non-judgment region B4 located at the bottom of the judgment region H4 is set. The pattern of the judgment region H4 is effective where inserting images and superimposed dialogs such as a weather forecasting chart displayed at a corner of the display region R is made into a non-judgment region B2. In addition, the non-judgment region B4 may be located at any one of the top, left, and right of the judgment region H4.

Although not illustrated, such a pattern may be employed, in which any two or three sides of the top, bottom, left and right of the judgment region H set at the center of the display region R are made into non-judgment regions B.

When a predetermined region setting key is pressed after any judgment region pattern is selected based on a predetermined operation of the operation section 60, the control section 50 operating as the judgment region setting section carries out control for setting the judgment region H to any optional position at any optional size so that it adjusts the ratio of the judgment region H and the non-judgment region B by widening and narrowing the width of the judgment region H and the non-judgment region B of the display region R of the video display section 40.

Based on a received video responsive to the broadcasting signal received by the receiving section 10, the control section 50 functions as judging section whether or not predetermined broadcasting has ended.

In particular, based on a received video corresponding to the judgment region H in the received video responsive to the broadcasting signal received by the receiving section 10, the control section functions as judging section whether or not the predetermined broadcasting has ended.

The control section 50 operating as the judging section judges that the predetermined broadcasting has ended, based on the ratio of the chronological fluctuation of the received video corresponding to the judgment region H in the received video being within a predetermined range.

Herein, a state where the ratio of the chronological fluctuation of the received video based on image data in the broadcast signals is within a predetermined range is not a state where airwaves are stopped, but is a state where a broadcasting video hardly changes although the airwaves are not those for wave tests, and corresponds to a state where an image of a scenery of the surrounding of a broadcasting station or an image of a scenery picked up by a fixed point TV camera is displayed. If a vehicle or people pass by the surrounding broadcasting station, their movements become a fluctuation of the image.

That is, an image of scenery of the surrounding of a broadcasting station has a little fluctuation in comparison with images of normal broadcasting. Therefore, if the ratio of the fluctuation of videos based on the broadcast signals is, for example, less than 50%, which is the threshold value, with respect to the reference value of the predetermined fluctuation of videos, it is devised to judge that the predetermined broadcasting has ended.

Also, the fluctuation ratio of videos in the normal broadcasting is counted and detected, wherein the value of the 100% fluctuation, which becomes the reference value, is set.

In detail, the control section 50 operating as the judging section stores image data associated with the broadcast signals acquired at predetermined timing in the RAM 53 of the control section 50, and at the same time, acquires image data associated with new broadcast signals in a predetermined time (for example, in one minute or in five minutes). The previously acquired image data are compared with the image data acquired later. Where the fluctuation of the image is less than 50%, which is the threshold value, it is judged that the broadcasting has ended. On the other hand, where the fluctuation of the image exceeds 50% as the threshold value, it is judged that the broadcast signals associated with the predetermined broadcasting is being received, and image data acquired later are stored in the RAM 53 of the control section 50, wherein image data of new broadcast signals are acquired in a predetermined time, and it is repeated that the image data stored in the RAM 53 are compared with the newly acquired image data.

In addition, since the image data associated with "color bar image" and "monoscopic image" are the same if they are image data at any timing, the fluctuation becomes almost 0% when the previously acquired image data are compared with the image data acquired later, and it becomes less than 50% being the threshold value.

In particular, since, based on the ratio of the chronological fluctuation of received videos corresponding to a predetermined judgment region H being within a predetermined range, the control section 50 operating as judging section in the invention judges that predetermined broadcasting has ended, a change in the received videos corresponding to the predetermined non-judgment region B does not influence judgment of end of broadcasting.

That is, by making the black belt portions displayed in the display region R into the non-judgment region B, it can be prevented that the fluctuation of the entire video is lowered due to no change in the video in the black belt portions, and by making inserting images and superimposed dialogs such as a weather forecasting chart, which is displayed in the display region R, into the non-judgment region B, it is possible to prevent changes in the videos of inserting images and superimposed dialogs from increasing the fluctuation of the entire videos. Therefore, it becomes possible to further accurately judge the end of broadcasting based on the video when the program broadcasting is ended.

In addition, based on no synchronization signal being included in the broadcast signals, the control section 50 operating as the judging section judges that the broadcasting has ended.

Herein, a state where no synchronization signal is included in the broadcast signals means a state where airwaves are stopped, predetermined broadcasting is ended, and corresponds to a "sandstorm screen."

On the basis that the audio data are audio signals having specified frequencies and the image data are image signals for displaying specified images, the control section 50 operating as the judging section judges that the predetermined broadcasting has ended.

Here, a state where the audio data in the broadcast signals are audio signals having specified frequencies, and the image data in the broadcast signals are image signals for displaying specified images refers to that the airwaves are airwaves for wave tests, and corresponds to a state where a "color bar image" and a "monoscopic image" are brought about after the predetermined broadcasting is ended.

Also, the method for the control section 50, which operates as the judging section, to judge that the airwaves are stopped, the airwaves are those for wave tests, and images based on the airwaves are images of scenery of the surrounding of a broadcasting station, is an already known art. Therefore, a detailed description thereof is not given.

In addition, the control section 50 counts the predetermined set time, and simultaneously functions as OFF-timer control section for switching the power source of a television receiver 100 from ON to OFF after the set time is over.

Further, the set time is inputted by the operation section 60, and is stored and set in the RAM 53. Any optional time can be set. The set time may be set to the hour (for example 2:00 a.m.) on which the power source is switched from ON to OFF, or may be set to predetermined hours (for example, one hour and 30 minutes) until the power source is switched from ON to OFF.

In particular, while the control section 50 operating as the OFF-timer control section counts the predetermined set time, the control section 50 operating as the judging section judges whether or not the predetermined broadcasting has ended.

That is, in a state where the OFF timer is set so that the power source of the television receiver 100 is switched from ON to OFF after the set time is over, the control section 50 operating as the judging section judges whether or not the predetermined broadcasting has ended.

On the basis that the control section 50 operating as the judging section judges that the predetermined broadcasting has ended, the control section 50 functions as control section to control the stop of display of received videos based on the broadcast signals in the video display section 40 and of output of audio based on the broadcast signals in the audio output section 30.

By switching the power source of the television receiver to OFF, the control section 50 operating as the video stop control section may carry out switching control from display of the received videos in the video display section 40 to non-display or may carry out control of switching the received videos based on the broadcast signals to non-display by reproducing video signals stored in a DVD by means of the video player 20 and switching so that reproduced videos based on the video signals are displayed on the video display section 40.

That is, in the television receiver 100, the power source of the television receiver 100 may be quickly turned off in line with the control section 50 operating as the judging section judging that the predetermined broadcasting has ended, or the power source of the television receiver 100 may be switched to OFF at predetermined timing after video signals reproduced by the video player 20 are displayed, so that the received videos based on the broadcast signals are not displayed, on the basis that the control section 50 operating as the judging section judges that the predetermined broadcasting has ended.

Figure 4:
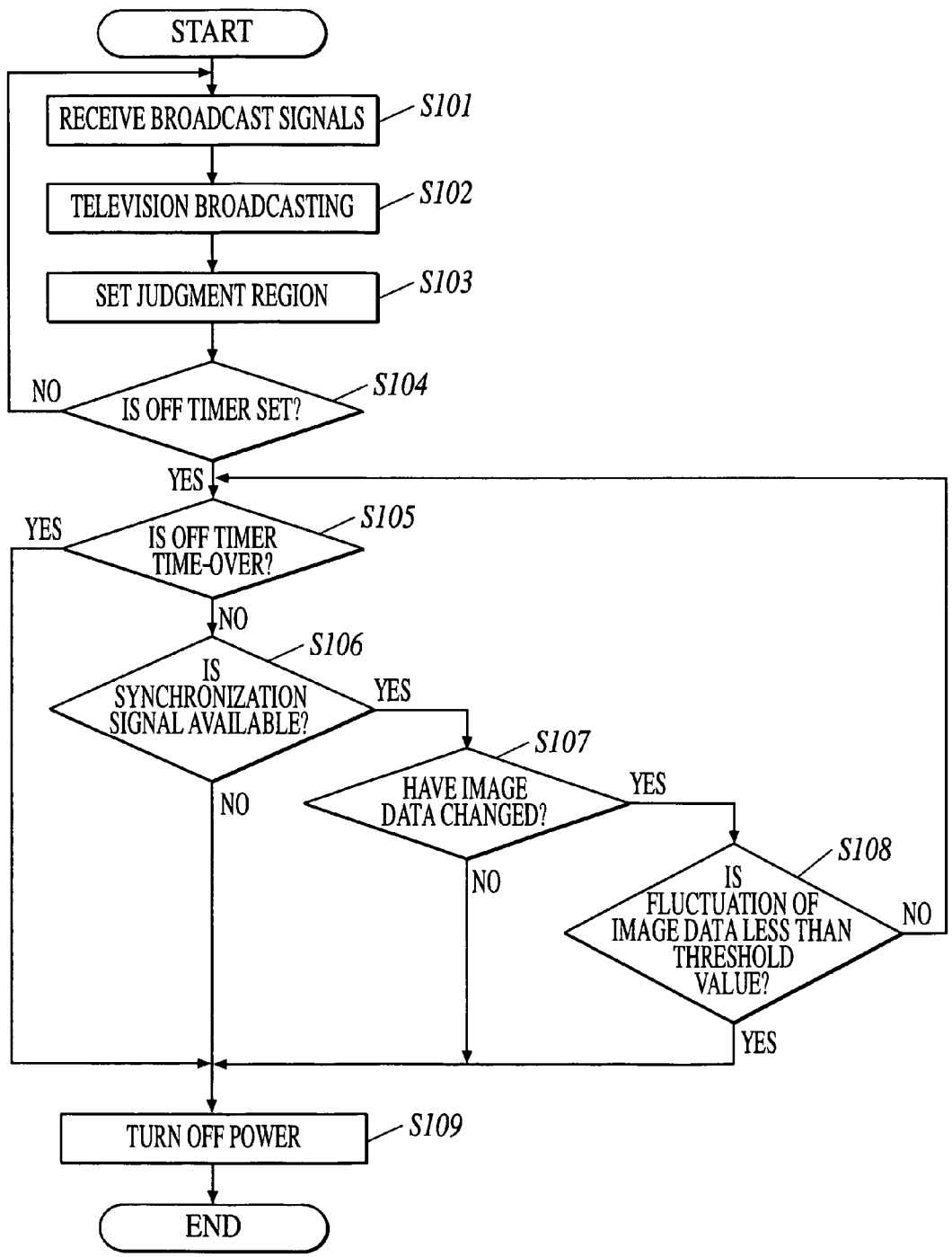
FIG. 4 is a flowchart depicting one example of the video display process of a television receiver according to the invention.

Next, a description is given of one example of a process by which, in the television receiver 100, end of the program broadcasting is judged based on broadcast signals, and received videos are switched to non-display, with reference to a flowchart of FIG. 4.

First, by pressing the main switch (not illustrated) in the television receiver 100, the television receiver 100 receives broadcast signals associated with predetermined broadcasting in response to a selected channel via the receiving section 10 (Step S101).

The control section 50 converts the received broadcast signals to received video data consisting of audio data and video data being digital data, and simultaneously, output audio based on the audio data and video and images based on the image data from the audio output section 30 and the video display section 40, respectively. Thus, television broadcasting responsive to the received video data based on the broadcast signals is carried out (Step S102).

Next, by operating a predetermined operation key in the operating section 60, a judgment region H of desired size is set at a desired position so that the display region R of the video display section 40 is divided into the judgment region H and non-judgment region B (Step S103).

Next, the control section 50 judges whether or not the OFF timer is set in the television receiver 100 (Step S104).

If the control section 50 judges that the OFF timer is not set (Step S104: No), the process is returned to Step S101, wherein television broadcasting is continued based on the broadcast signals.

On the other hand, if the control section 50 judges that the OFF timer has been set (Step S104: Yes), the control section 50 counts the time and hour, and simultaneously, judges whether or not the set time of the OFF timer is reached (Step S105).

If the control section 50 judges that the set time of the OFF timer is reached (Step S105: Yes), the process shifts to Step S109.

On the other hand, if the control section 50 judges that the set time of the OFF timer is not reached (Step S105: No), the control section 50 monitors the end of the predetermined broadcasting based on the broadcast signals.

The control section 50 judges, on the basis that no synchronization signal is included in the broadcast signals, that the predetermined broadcasting has ended (Step S106: No), the process shifts to Step S109.

On the other hand, if the control section 50 judges that a synchronization signal is included in the broadcast signals (Step S106: Yes), the process shifts to Step S107.

In Step S107, if the control section 50 judges that the predetermined broadcasting has ended (Step S107: Yes) since the image data in the broadcast signals are image signals for displaying a specified image (for example, a color bar image or a monoscopic image) and there is no change in the image data, the process shifts to Step S109.

On the other hand, if the control section 50 judges that there is a change in the image data in the broadcast signals (Step S107: No), the process shifts to Step S108.

In Step S108, if the control section 50 judges, on the basis that the ratio of the chronological fluctuation of received videos corresponding to the judgment region H of the display region R is smaller than a predetermined threshold value and is within a predetermined range, that the predetermined broadcasting has ended (Step S108: Yes), the process shifts to Step S109.

On the other hand, if the control section 50 judges that the ratio of the chronological fluctuation of the received videos corresponding to the judgment region H of the display region R is not within a predetermined range being the threshold value (Step S108: No), the process is returned to Step S105, wherein the control section 50 carries out television broadcasting based on the broadcast signals and continues monitoring in association with the set time of the OFF timer and judgment for the end of the broadcasting.

In Step S109, the control section 50 switches the power source of the television receiver 100 to OFF and switches display of the received videos in the video display section 40 to non-display so as to stop outputting of audio responsive to audio data of the received video data based on the broadcast signals and output of the received videos responsive to the image data of the received video data (Step S109), and the control section 50 stops the television receiver 100 and terminates the operation process of the television receiver 100.

Thus, with the television receiver 100 according to the invention, where, when the television receiver 100 receives broadcast signals associated with predetermined broadcasting and carries out television broadcasting such as received videos responsive to the broadcast signals, it is judged based on the received video that the predetermined broadcasting has ended, the power source of the television receiver 100 can be turned off to switch display of the received videos responsive to the broadcast signals to non-display. Therefore, it is possible to prevent the television receiver 100 from being continuously turned on after the program broadcasting has ended, wherein it is possible to achieve electric power saving.

In particular, since the television receiver 100 according to the invention can establish a judgment region H of desired size at a desired position by dividing the display region R of the video display section 40 into a judgment region H and a non-judgment region B, end of broadcasting can be judged based on the chronological fluctuation of the received videos corresponding to the judgment region H. Therefore, it becomes possible to further accurately judge the end of predetermined broadcasting without being influenced by inserting images and superimposed dialogs such as a weather forecasting chart overlapped and displayed on video of the surrounding scenery of a broadcasting station and scenery from a fixed-point TV camera and changes in the video in the black belt portions displayed in the display region R after the predetermined broadcasting has ended. By further accurately judging the terminal of program broadcasting, electric power saving performance can be improved.

Further, since the television receiver 100 is set so that the power source of the television receiver 100 is switched from ON to OFF after a predetermined duration of time elapses, for example, like a good-night timer, end of broadcasting is judged when the set time is counted. When it is judged that the predetermined broadcasting has ended, the power source of the television receiver 100 can be switched from ON to OFF even before the predetermined set time where it is judged that the predetermined broadcasting has ended. Therefore, the electric power saving efficiency can be improved.

Next, a description is given of an embodiment in which end of the program broadcasting is judged based on the broadcast signals and a process for switching the received videos to non-display in the television receiver 100.

Since the television receiver 100 is a television receiver having a video display unit integrated therewith, the power source of the television receiver 100 is not switched to OFF in line with end of predetermined broadcasting, but video signals stored in a recording medium are reproduced by the video player 20, and the reproduced videos may be displayed on the video display section 40.

Figure 5:
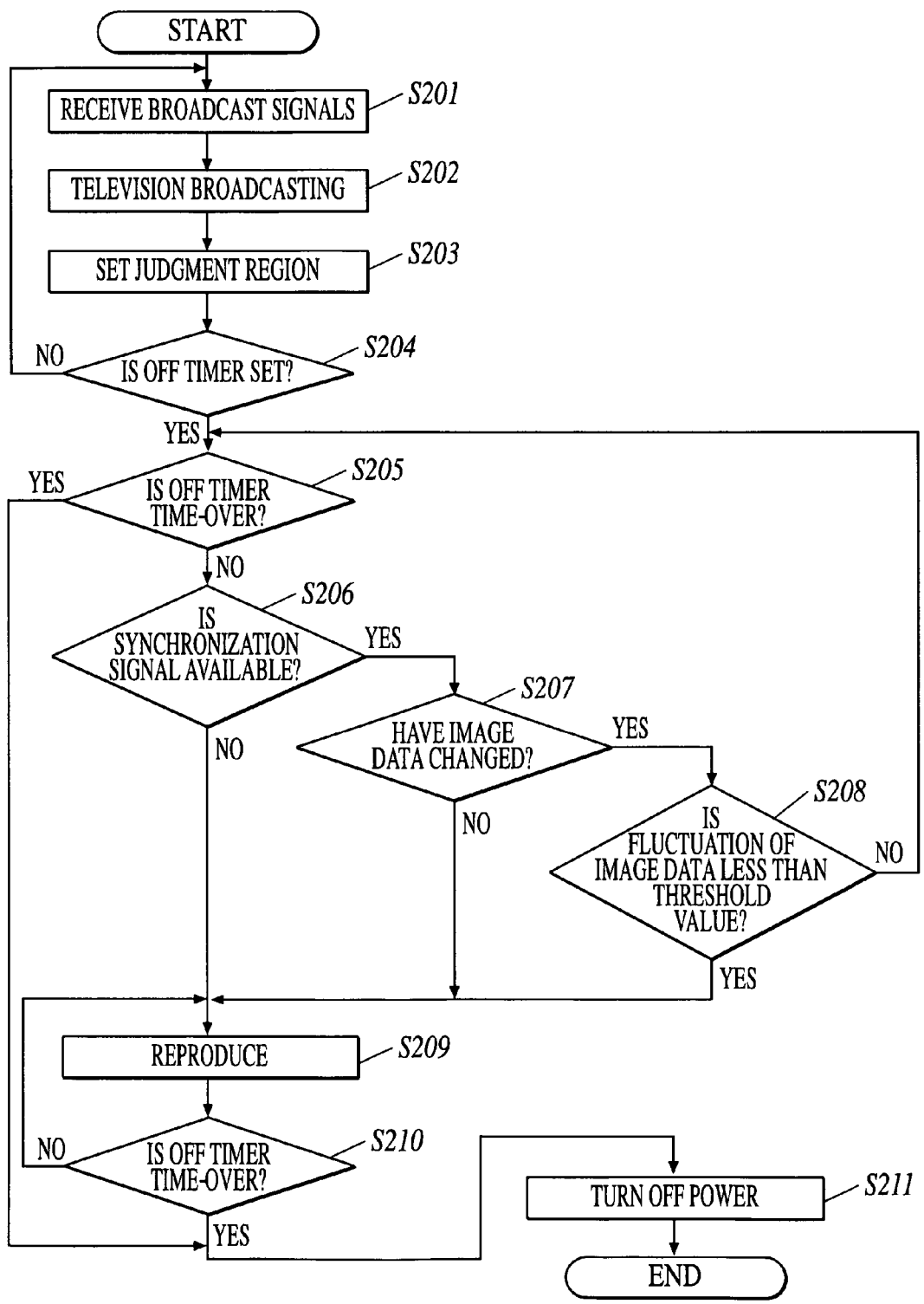
FIG. 5 is a flowchart depicting one example of the video display process of a television receiver according to the invention.

A description is given of an example of changing to reproduced videos by the video player 20 after end of the program broadcasting, with reference to a flowchart of FIG. 5.

Since actions from Step S201 through Step S208 in the flowchart of FIG. 5 are similar to those from Step S101 through Step S108, the description thereof is omitted.

In Step S209, the control section 50 stops outputting audio responsive to audio data of the received video data based on the broadcast signals and the received videos responsive to the image data of the received video data, simultaneously reproduces video signals stored in a predetermined recording medium by means of the video player 20, displays reproduced videos responsive to the video data based on the reproduced video signals on the video display unit 40, and outputs audio responsive to the video signal data from the audio output section 30, thereby switching the received videos based on the broadcast signals to non-display (Step S209).

Next, the control section 50 judges whether or not the set time of the set OFF timer is reached, counting the time and hour (Step S210).

If the control section 50 judges that the set time of the OFF timer is reached (Step S210: Yes), the process shifts to Step S211.

On the other hand, if the control section 50 judges that the set time of the OFF timer is not reached (Step S210: No), the process is returned to Step S209, wherein reproduction of the video signals is continued.

In Step S211, the control section 50 switches the power source of the television receiver 100 from ON to OFF in line with judging that the set time of the OFF timer is reached, stops the television receiver 100 (Step S211), and terminates the operation process of the television receiver 100.

Thus, with the television receiver 100 according to the invention, where the television receiver 100 receives broadcast signals associated with predetermined broadcasting, and judges, based on the received videos, that the predetermined broadcasting has ended when carrying out television broadcasting of received videos responsive to the broadcast signals, the television receiver 100 stops broadcasting of the received videos responsive to the broadcast signals, and simultaneously switches the received video to non-display by reproducing the video signals recorded in a DVD by means of the video player 20, thereby switching the screen to display of reproduced videos responsive to the video signals.

In addition, since the television receiver 100 is set so that the power source thereof is switched from ON to OFF in a predetermined time such as, for example, a good-night timer, it is judged whether or not the predetermined broadcasting has ended when counting the set time. When it is judged that the predetermined broadcasting has ended, the video player 20 automatically reproduces video signals, and the reproduced videos are displayed.

That is, where a user sets the set time of the good-night timer and OFF timer and intends to watch received videos based on the broadcast signals associated with the predetermined broadcasting for some hours more or up to specified time, if the broadcasting is ended before the set time, the display can be automatically switched to reproduced videos. Therefore, the user can watch the reproduced videos up to the set time.

Since the power source of the television receiver 100 can be switched from ON to OFF by the good-night timer or OFF timer after the set time is over, it is possible to prevent the power source of the television receiver 100 from being kept on or prevent the television receiver 100 from being continuously turned on.

As has been described in the embodiment, the threshold value of the chronological fluctuation of videos is not limited to 50%, wherein the threshold value may be optionally set in compliance with an object to be displayed as a video and patterns of received videos after the broadcasting is ended.

Also, it is a matter of course that other detailed minute structures may be adequately modified.

The entire disclosure of Japanese Patent Application No. 2005-159495 filed on May 31, 2005, including description, claims, drawings and summary are incorporated herein by reference.

What is claimed is:

1. A television receiver comprising:
   a receiving section to receive a broadcast signal associated with predetermined broadcasting;
   a video display section to display received video based on the broadcast signal received by the receiving section in a predetermined display region; and
   a control section to control a movement of the television receiver, the control section including:
   a judgment region setting section to set a judgment region used for judging whether or not the broadcasting has ended, at a center of the display region of the video display section;
   an off-timer control section to count a predetermined set time, and to switch a power source of the television receiver from ON to OFF when the set time lapses;
   a judging section to judge whether or not the broadcasting has ended, on a basis that a ratio of chronological fluctuation of received video in the judgment region set by the judgment region setting section of the received videos corresponding to the broadcast signal is within a predetermined range, while the off-timer control section counts the set time; and a video stop control section to switch off the power source of the television receiver, on a basis that the judging section judges that the broadcasting has ended.

2. A television receiver comprising:

a receiving section to receive a broadcast signal associated with predetermined broadcasting;

a video display section to display received video based on the broadcast signal received by the receiving section in a predetermined display region; and a control section to control a movement of the television receiver, the control section including:

a judgment region setting section to set a judgment region used for judging whether or not the broadcasting has ended, the judgment region being in the display region of the video display section;

a judging section to judge whether or not the broadcasting has ended, based on received video in the judgment region set by the judgment region setting section of the received video corresponding to the broadcast signal; and a video stop control section to switch off a power source of the television receiver, on a basis that the judging section judges that the broadcasting has ended.

3. The television receiver according to claim 2, wherein the judging section judges end of the broadcasting on a basis that a ratio of chronological fluctuation of the received video in the judgment region is within a predetermined range.

4. The television receiver according to claim 2, wherein the control section further includes an off-timer control section to count a predetermined set time, and to switch the power source of the television receiver from ON to OFF when the set time lapses, and the judging section judges whether or not the broadcasting has ended, while the off-timer control section counts the set time.

5. The television receiver according to claim 3, wherein the control section further includes an off-timer control section to count a predetermined set time, and to switch the power source of the television receiver from ON to OFF when the set time lapses, and the judging section judges whether or not the broadcasting has ended, while the off-timer control section counts the set time.

6. The television receiver according to claim 2, wherein the judgment region is set at a center of the display region.

* * * * *